Aug. 18, 1953
A. M. KIVARI ET AL
2,649,412
CLARIFICATION
Filed April 13, 1951
3 Sheets-Sheet 1
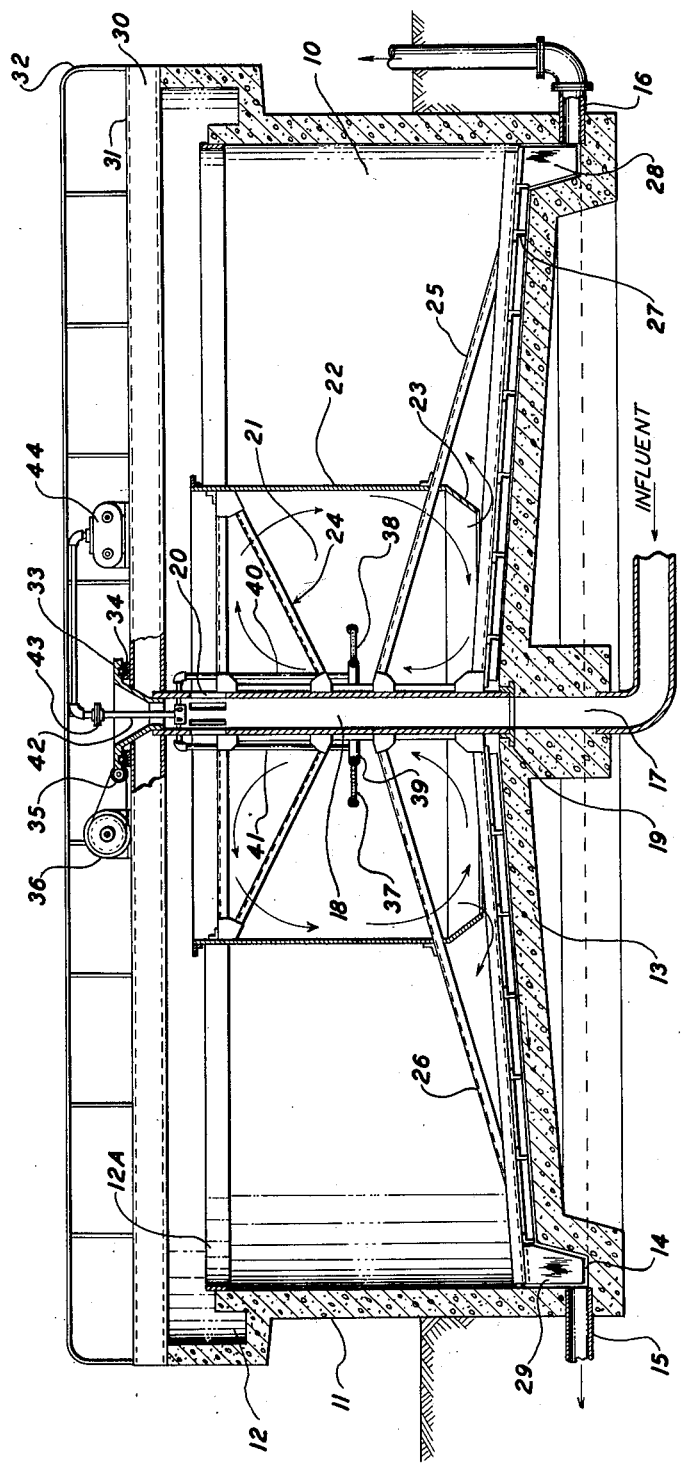
FIG. I.
INVENTORS.
ARTHUR M. KIVARI
EARL M. KELLY
BY
*James B. Christie*
ATTORNEY Aug. 18, 1953 A. M. KIVARI ET AL 2,649,412
CLARIFICATION
Filed April 13, 1951 3 Sheets-Sheet 2

INVENTORS.
ARTHUR M. KIVARI
EARL M. KELLY
BY
James B. Christie
ATTORNEY

Aug. 18, 1953  A. M. KIVARI ET AL  2,649,412
CLARIFICATION

Filed April 13, 1951  3 Sheets-Sheet 3

INVENTORS.
ARTHUR M. KIVARI
EARL M. KELLY
BY
James B. Christie
ATTORNEY

Patented Aug. 18, 1953

2,649,412

UNITED STATES PATENT OFFICE 2,649,412

CLARIFICATION

Arthur M. Kivari, Los Angeles, and Earl M. Kelly, Burlingame, Calif., assignors to Process Engineers Incorporated, San Francisco, Calif., a corporation of California Application April 13, 1951, Serial No. 220,776

11 Claims. (Cl. 210—3)

This invention relates to clarification and more particularly to clarification of sewage. It provides improved clarifying apparatus particularly adapted for sewage treatment but useful in other processes involving the separation of solids from liquids by settlement.

In U. S. Patent 2,506,927, granted May 9, 1950, one of us describes sewage treatment with aeration, coagulation and sedimentation in a single circular tank. The influent, say raw sewage, enters the tank through a central column and discharges into an inner circular compartment separated from the outer or rim portion of the tank by an upright annular baffle extending above the liquid level in the tank but open at the bottom. In the inner circular compartment the influent is aerated and circulated and may be mixed with previously formed flocs. Liquid and unsettled solids pass into the outer annular compartment for upflow sedimentation. Settled solids deposited in the bottom of either the outer compartment or the inner compartment are raked down the gently sloping inverted conical surface of the tank bottom to a central sludge outlet and then discharged. Clarified effluent overflows a peripheral weir at the upper rim of the tank.

The foregoing apparatus has met with outstanding commercial success. It has been particularly successful in sewage treatment, where economical clarification is achieved by concentrating solids in an aerobic environment which is conducive to the flocculation of colloidal and gelatinous suspended matter. However, in some instances the sludge produced is not as dense as is desired.

As a result of our investigations we have developed an improved apparatus in which the benefits heretofore secured by the apparatus described and claimed in U. S. Patent 2,506,927 are still obtained and in which it is possible to produce denser sludge. This is accomplished by raking settled sludge from both the inner and outer compartments to one or more non-central discharges which may be located anywhere in the bottom of the outer compartment or in the bottom just within the inner or agitation compartment, i. e. immediately inside and below the baffle which separates the inner or aeration and agitation compartment from the outer or sedimentation compartment.

In the preferred form of the apparatus, means is provided for returning sludge from a point in or near the sludge sump or outlet into the agitation compartment for further mixing and circulation with influent. In this fashion, fine floc already formed is used to seed the incoming sewage or other influent. This brings about better and faster flocculation of colloidal and gelatinous material in the feed and at the same time increases the particle size of the initial floc so as to further increase settlement rate and sludge density.

These and other aspects of our invention will be understood more thoroughly in the light of the following detailed description taken in conjunction with the accompanying drawings, in which:

Fig. 1 is a vertical elevation, partly in section, through one form of the apparatus of our invention, in which settled solids are moved to the outer rim of the apparatus;

Figure 5:
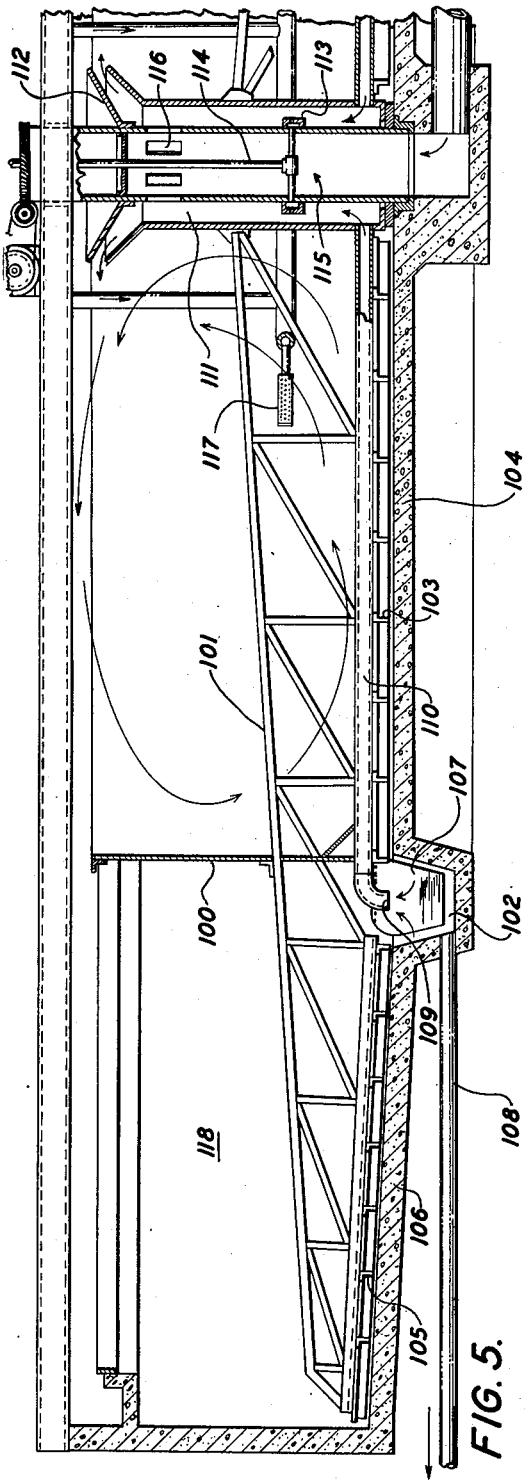
Fig. 5 is a vertical fragmentary elevation, partly in section, through another form of the apparatus.

The apparatus of Fig. 1 comprises an upright cylindrical and relatively shallow tank 10, having a concrete outside wall 11. This wall carries an annular launder 12 at its upper periphery into which clarified effluent overflows over a circular weir 12A. The concrete bottom 13 of the tank is in the form of a flat cone which slopes gently outward to a peripheral sludge pocket 14 adjacent the lower portion of the wall, sludge being withdrawn from this pocket by a plurality of outlets 15, 16. Material to be treated, say raw sewage from which tramp iron, coarse wood and some grit has been removed, is introduced into the apparatus from the bottom through a central riser 17. The riser opens into a central column 18 which is rotatable around the upright axis of the tank and is supported in a submerged bearing 19 at the bottom of the column. The influent escapes from the column through a plurality of outlet ports 20 near its top near the liquid level maintained in the tank by the weir and enters a central or aeration compartment 21. This is defined by an annular baffle 22 that extends above the liquid level in the tank and drops vertically to a level near the bottom where it terminates in an inverted frusto-conical extension 23. This baffle and its extension is supported by a radial cage structure 24 that is fastened to the central column and rotates with it. The cage also provides support for radial rake arms 25, 26 which extend under the baffle from the central column to the lower periphery of the tank. These arms carry rakes 27 which move settled solids in a spiral path from the center column to the peripheral sludge discharge pocket. The outer ends of the arms carry upright scrapers 28, 29 which drop into the sludge pocket and rotate slowly in this annular trough, thereby moving the sludge toward the several discharge pipes and preventing it from accumulating.

If desired, the annular baffle may be supported by radial trusses disposed in the sedimentation compartment and fastened to the outside wall, for example, after the fashion disclosed in our co-pending application Serial No. 96,184, filed May 31, 1949, now Patent No. 2,568,452.

If scum tends to form on the pool in the sedimentation compartment, conventional skimming devices may be employed.

A conventional superstructure 30 extends across the tank at the top and is supported on the outside wall of the launder 12. It is provided with the usual walkway 31 and handrail 32. The central column has a horizontal ring gear 33 mounted on its upper end. This gear rests upon an annular bearing 34 fastened to the superstructure and is driven by a second gear 35 that in turn is rotated by a motor 36 mounted on the superstructure.

The contents of the agitation compartment is aerated by a group of horizontal radial air dispersers 37, 38 that are fed by an air manifold pipe 39 which in turn receives air from feed pipes 40, 41. These pipes are connected to a vertical air supply line 42 on the axis of the column. This line is connected through a rotatable joint 43 with a blower 44 mounted on the superstructure.

Compressed air is blown into the aeration compartment through the radial air diffusers and this induces a circulation of the contents as indicated by the arrows. The inverted frusto-conical section at the bottom of the baffle helps to divert the circulating stream inwardly toward the center column.

In operation, the inflowing sewage rises in the center column and passes out through the radial outlets near the top of the pool of material undergoing treatment in the tank. Flocculation and settlement of the solids contained in the sewage are facilitated by the aeration and circulation action which has just been described and which takes place in the inner or agitation compartment. In addition, the air maintains an aerobic condition in the sewage and helps to satisfy its biological oxygen demand. Some solids tend to settle at the bottom of the aeration compartment, from whence they are moved by the rakes toward the annular discharge pocket or trough 14 at the periphery of the apparatus. However, the bulk of the solids remains suspended in the liquid and flow out into the outer annular sedimentation zone which is relatively quiescent. The bulk of the settlement occurs here and solids, as they settle, join those from the bottom of the aeration compartment and are raked outwardly into the discharge pocket and removed as sludge through the pipes 15, 16. Clarified liquid overflows at the top of the apparatus into the peripheral launder 12.

Figure 2:
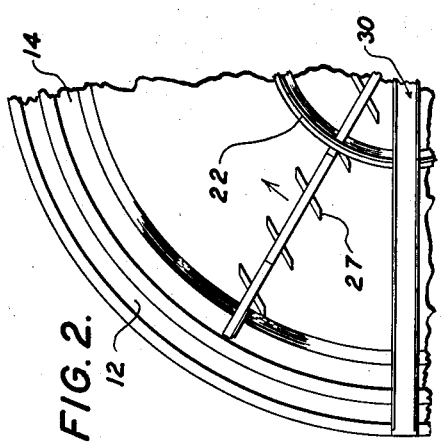
Fig. 2 is a fragmentary plan view of the apparatus of Fig. 1.

The principal advantage of the apparatus of Figs. 1 and 2 resides in the fact that a settled sludge of a higher density can be removed from the apparatus.

The denser sludge represents a cleaner separation of solids and liquid and sludge of higher density is easier to handle in subsequent treatment steps. Moreover, the return of a denser but still finely divided sludge to the coagulation going on in the aeration zone facilitates such coagulation and increases the throughput of the apparatus.

Figure 3:
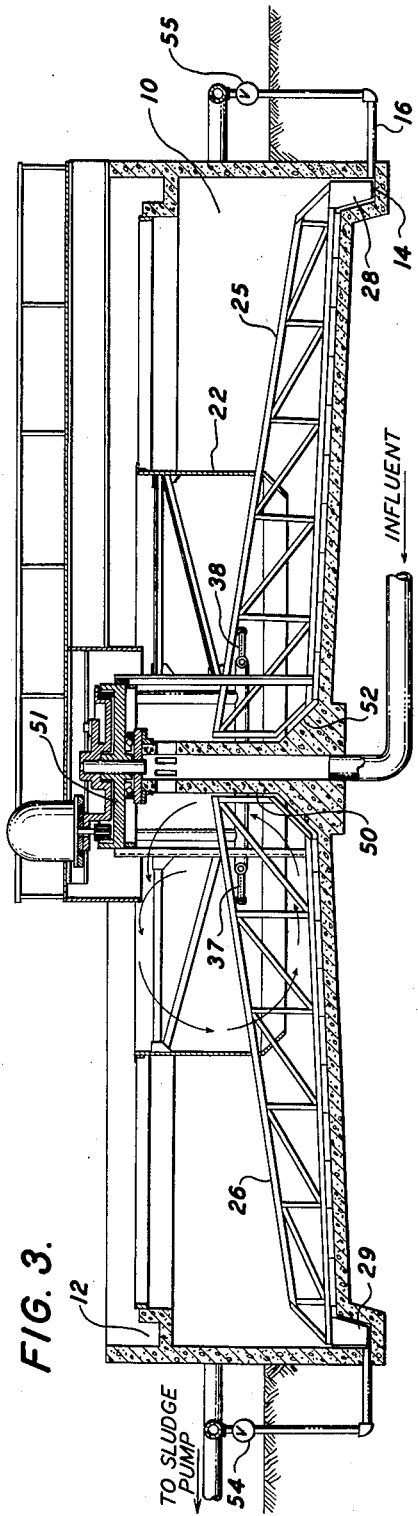
Fig. 3 is a vertical elevation, partly in section, through a modified form of the apparatus of Figs. 1 and 2.

The apparatus of Fig. 3 is, in general, similar to that of Figs. 1 and 2, like parts being indicated by like reference characters. The structure of Fig. 3 differs as follows:

The central column through which the influent is introduced is an annular concrete pier 50 which supports a drive mechanism 51 of the type described and claimed in co-pending application Serial No. 222,457, filed April 23, 1951, by Samuel I. Bousman. The pier has an enlarged frusto-conical base 52 which tends to divert the circulating stream in the aeration compartment upwardly along the pier wall as indicated by the arrows.

Secondly, the apparatus of Fig. 3 is provided with valves 54, 55 on the outlet lines 15, 16 to control the rate of withdrawal of sludge to a pump, not shown.

Figure 4:
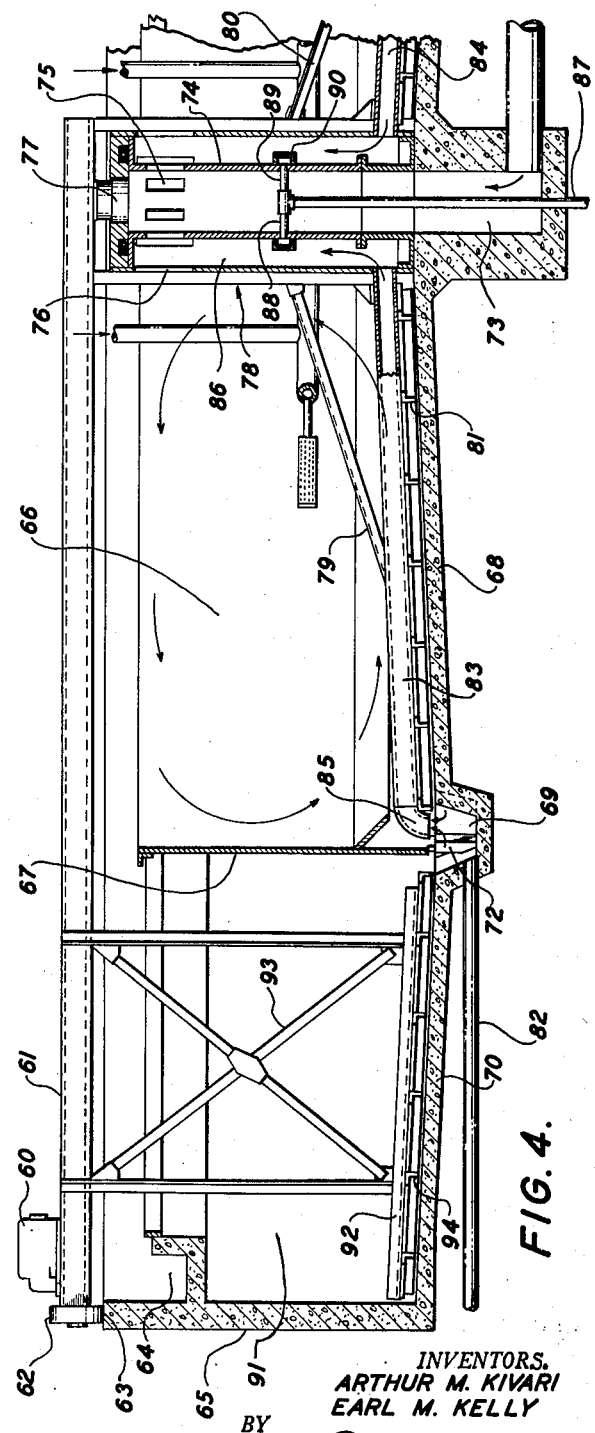
Fig. 4 is a fragmentary vertical elevation, partly in section, through still another modification of the apparatus of Figs. 1 and 2.

The apparatus illustrated in Fig. 4 is of the traction type, rotation of the rake mechanism being accomplished by a motor 60 mounted on the outer end of a radial beam 61 and driving a traction wheel 62 which rides on a peripheral track 63. The tank is provided with the conventional peripheral launder 64 at its upper rim and with a vertical circular side wall 65 which supports the launder. The bottom of the tank slopes gently in two directions. Thus the inner portion 68 below the agitation zone 66 defined by the annular baffle 67 is conical from the inside toward one or more discharge pockets 69 extending around the apparatus almost underneath the baffle. The outer portion 70 of the bottom is an inverted frusto-conical section sloping gently in the opposite direction from the outer wall toward the discharge.

In the apparatus of Fig. 4 the baffle which defines the inner or aeration zone is supported from the bottom on piers 72, there being substantial gaps between piers to permit passage of material underneath the baffle.

Feed for the apparatus of Fig. 4 enters the central feed well 73 and rises upward in a central column 74 from which it escapes through ports 75 and thence through ports 76 into the agitation or aeration zone. The inner end of the beam 61 is rotatably supported by a bearing structure 77 resting on the top of the column. An inner cage 78 is fastened rigidly to the beam and carries rake arms 79, 80. These in turn carry rakes 81 which are slanted so as to cause solids settling in the agitation compartment to travel outward into the discharge pocket 69. Solids settling into the discharge pits are withdrawn through radial pipes 82 extending outwardly below the apparatus.

Each rake arm carries a radial pipe 83, 84 which ends in a downwardly projecting elbow 85. These elbows terminate just above the discharge pocket. The pipes are connected with an annular circulating column 86 which extends upwardly around the influent column. A vertical coaxial air line 87 provided with branches 88, 89 rises upwardly to connect with a circular air disperser 90 inside the annular circulating column. This air disperser causes the annular return or circulating column to act as an airlift and to suck partially settled sludge from points adjacent the end of the elbow upwardly in the column to be mixed with the fresh influent and discharged into the agitation zone within the baffle. Here the contents of the agitation zone are further aerated by dispersers as in the case of the apparatus of Figs. 1 and 2.

That portion of the tank between its outside wall and the baffle constitutes a sedimentation zone 91 in which settlement takes place under relatively quiescent conditions. It is provided with radial rake arms 92 rigidly suspended from the rotating upper beam 61 by trusses 93. The rake arm is provided with rakes 94 so slanted that they tend to move settled solids inwardly toward the discharge pockets 69.

In the operation of the apparatus of Fig. 4, raw sewage to be treated is introduced into the center of the apparatus where it meets returned partially settled sludge rising in the air lift column 86. The mixture is discharged into the agitation zone where circulation is caused as in the previous case, by the air diffusers. Coagulation and flocculation of solids results and such solids as settle are raked toward the discharge pocket at the periphery of the agitation zone. Liquid and solids which do not settle to the bottom of the agitation zone flow underneath the baffle into the outer or sedimentation zone and are there settled under quiescent conditions, clarified effluent overflowing into the peripheral launder. Solids settling in the outer sedimentation zone are also raked to the discharge pocket. Any solids not recirculated through the return pipes carried by the inner rake arms are withdrawn from the apparatus and discharged.

The form of apparatus illustrated in Fig. 4 is particularly desirable in the larger sizes. As shown, it is of the traction type, and to simplify construction its baffle is supported from the bottom rather than with the rake arms. The use of a plurality of sludge pockets instead of a single annular one eliminates the scrapers employed in the latter and further reduces the power requirement of the equipment.

The apparatus of Fig. 5 is similar to that of Fig. 4, with the following exceptions:

It is not of the traction type. Its baffle 100, which defines the inner or agitation zone, is carried by the rake arms 101, the entire internal structure being rotated by conventional means, not shown.

The sludge pocket 102 is annular and extends completely around the bottom just outside the baffle.

The rakes 103 on the rake arm below the agitation zone tend to move settled sludge outwardly to the sludge pocket along a substantially level bottom 104. The rakes 105 below the sedimentation compartment are slanted in the opposite direction so as to move settled sludge down the gently sloping floor section 106 into the sludge pocket. The rake arms are provided with scrapers 107 which extend into the annular sludge pocket and tend to move the sludge toward the discharge pipes 108 and prevent the sludge from accumulating.

Adjacent the scrapers are the inlet ends 109 of sludge return pipes 110. These connect to an annular airlift column 111 as described for Fig. 4. The top of this annular airlift column flares outwardly with an inverted frusto-conical diverter 112 disposed above it so that the rising suspension of solids in liquid tends to be thrown out radially all around the column. Air for the lift is supplied to a circumferential air ring 113 by an air pipe 114 which is mounted on the vertical axis of the apparatus and drops down from above.

In the operation of the apparatus of Fig. 5, raw sewage to be treated enters the center of the apparatus, rises through the center column 115 and out through ports 116 into the annular airlift column where the incoming sewage mixes with returned partially settled sludge. The mixture is ejected into the aeration zone where it is aerated and caused to circulate as indicated by the arrows, the circulation being accomplished by air dispersers 117 as described in the case of Figs. 1 and 2. Such solids as settle to the bottom of the agitation zone are raked outwardly into the sludge discharge as previously described. The bulk of the solids do not settle in the agitation zone but pass underneath the baffle to the sedimentation zone 118 where settlement occurs under quiescent conditions, the resulting sludge being raked backward toward the annular sludge pocket. The return pipe 110 withdraws partially settled sludge which may come from either the aeration zone or the settling zone backward through the central column for recirculation in the aeration zone to accomplish the increased settlement and improved flocculation described previously.

Figure 6:
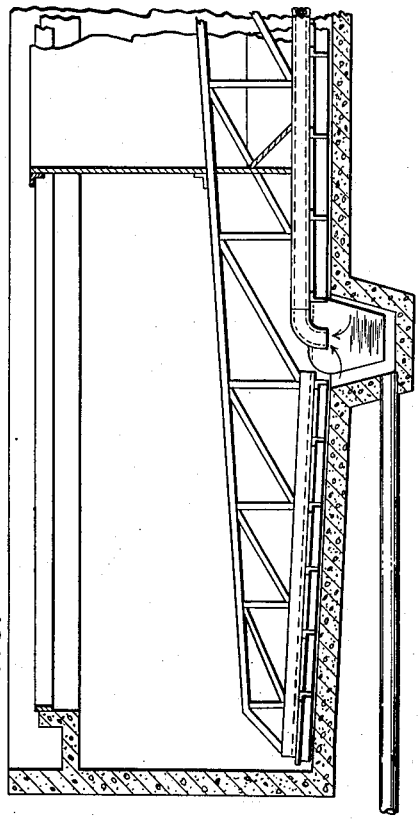
Fig. 6 is a fragmentary vertical elevation illustrating a modification of the apparatus of Fig. 5.

Fig. 6 illustrates a modification of the apparatus in Fig. 5, wherein the annular sludge pocket, instead of being disposed immediately outside the baffle which separates aeration and sedimentation zones, is disposed a substantial distance outside the barrier and well into the sedimentation zone. This is desirable in some instances, where it is desired to return a somewhat larger proportion of more completely settled solids to the aeration-recirculation operation in the agitation zone.

As indicated at the outset, the apparatus of the invention in the several forms illustrated, brings about excellent clarification and aeration of sewage and other suspensions of solids in liquids and results in the production of a thicker sludge or overflow than has heretofore been obtained.

The apparatus of the invention accomplishes a more thorough precipitation and settlement of finely divided solids than does the conventional clarifier, probably as a result of the aeration and the recirculation of nuclei which aid flocculation and coagulation. In consequence, there is a tendency to form a large mass of relatively thin sludge formed of very fine particles. Such a sludge takes a long time to settle in the region just above the bottom. Hence, in order to form a dense or thick sludge, it is desirable to provide a relatively large sludge pocket in which the sludge has a longer retention period and a greater opportunity to thicken by settlement. It is for this reason that the annular sludge pocket, with its comparatively large volume, is preferred over a single pocket or series of pockets scattered around the bottom.

We claim:

1. In apparatus for separating solids from sewage by settlement and including a tank having an inner compartment and an outer sedimentation compartment disposed around it, the two compartments communicating with each other just above the tank bottom but separated from each other at higher levels by an annular imperforate baffle, means for introducing the sewage into the inner compartment, and means for withdrawing clarified sewage from an upper portion of the outer compartment, the combination which comprises a sludge pocket located below the bottom of the tank and at a level lower than that of the bottom of the baffle within the region which begins underneath the baffle and which extends to the periphery of the tank bottom, means disposed in the inner compartment for aerating the contents thereof to cause an up-and-down circulation of liquid and solids in the sewage between an intermediate and an upper portion of the compartment to bring about flocculation of finely divided solids in the sewage, raking means extending along the bottom substantially to the pocket for raking settled solids along the tank bottom into the pocket from the tank bottom underlying both compartments, and means for withdrawing solids from the pocket.

2. In apparatus for separating solids from sewage by settlement and including a tank having an inner compartment with an outer sedimentation compartment disposed around it, the two compartments communicating with each other just above the tank bottom but separated from each other at higher levels by an annular imperforate baffle, means for introducing the sewage into the inner compartment, and means for withdrawing clarified sewage liquid from an upper portion of the outer compartment, the combination which comprises an annular sludge channel extending around the tank and located in the bottom of the tank at a level below that of the bottom of the baffle and within the region which begins underneath the baffle and which reaches to the periphery of the tank bottom, means disposed in the inner compartment for aerating the contents thereof and causing the contents to circulate between an intermediate and an upper level therein with resultant flocculation of finely divided solids, raking means along the bottom extending substantially to the channel for raking settled solids into the channel immediately over the tank bottom underlying both compartments, and a conduit for withdrawing solids from the channel.

3. Apparatus according to claim 2 provided with a scraper disposed in the channel, and means for rotating the scraper around the channel to carry the solids to the conduit.

4. In apparatus for separating solids from sewage by settlement and including a tank having an inner compartment with an outer sedimentation compartment disposed around it, the two compartments communicating with each other just above the tank bottom but separated from each other at higher levels by an annular imperforate baffle, means for introducing the sewage into the inner compartment, and means for withdrawing clarified sewage liquid from an upper portion of the outer compartment, the combination which comprises a sludge sump located in the bottom of the tank in the region which begins underneath the baffle and which extends to the periphery of the tank bottom, means disposed in the inner compartment at an intermediate level for aerating the contents thereof and causing circulation of the aerated contents up and down between the intermediate level and an upper level in the inner compartment with resultant flocculation of finely divided solids, raking means extending along the bottom substantially to the sump for raking settled solids into the pocket from and over the tank bottom underlying both compartments, means for withdrawing solids from the sump, and means for withdrawing settled solids from the region of the sump and returning them to the inner compartment.

5. Apparatus according to claim 4 in which the means for withdrawing settled solids from the region of the sump and returning them to the inner compartment comprises an airlift.

6. Apparatus according to claim 4 in which the means for withdrawing settled solids from the region of the sump and returning them to the inner compartment comprises an airlift disposed in the central portion of the tank and a rotatable pipe extending from the airlift to said region.

7. In apparatus for separating solids from sewage by settlement and including a tank having an inner compartment with an outer sedimentation compartment disposed around it, the two compartments communicating with each other just above the tank bottom but separated from each other at higher levels by an imperforate annular baffle, means for introducing the sewage into the inner compartment, and means for withdrawing clarified sewage liquid from an upper portion of the outer compartment, the combination which comprises a sludge sump located below the bottom of the tank in the region which begins underneath the baffle and which extends to the periphery of the tank bottom, means disposed in the inner compartment for aerating the contents thereof and causing the aerated contents to circulate up and down in the inner compartment with resultant flocculation of solids, raking means extending along the tank bottom substantially to the sump and rotatable about the upright axis of the tank for raking settled solids across the tank bottom into the sump from the tank bottom underlying both compartments, and means for withdrawing the settled solids from the sump.

8. Apparatus according to claim 7 in which the raking means comprises a radial arm, and means is provided for returning the settled solids from the neighborhood of the sump to the inner compartment comprising a pipe supported by the arm and means for forcing the solids through the pipes.

9. Apparatus according to claim 7 in which the raking means comprises an arm extending outwardly from the center of the tank and carrying a plurality of rake members, and with the bottom of the tank sloping downwardly and outward toward the region of the sump.

10. In apparatus for separating solids from sewage by settlement and including a tank having an inner compartment with an outer sedimentation compartment disposed around it, the two compartments communicating with each other just above the tank bottom but separated from each other at higher levels by an imperforate annular baffle, means for introducing the sewage into the inner compartment, and means for withdrawing clarified sewage liquid from an upper portion of the outer compartment, the combination which comprises a sludge pocket located below the bottom of the tank and the bottom of the baffle in the region beginning underneath the baffle and extending to the periphery of the tank bottom, means for agitating the contents of the inner compartment with air and for causing the aerated contents to circulate up and down in the inner compartment with resultant flocculation of solids, raking means extending along the bottom substantially to the pocket for raking settled solids directly into the pocket across the tank bottom underlying both compartments, and means for withdrawing solids from the pocket.

11. In apparatus for separating solids from sewage by settlement and including a tank having an inner compartment surrounded by an outer annular sedimentation compartment with the two compartments communicating with each other only at a level slightly above the tank bottom, means for introducing the sewage into the inner compartment and means for withdrawing clarified sewage effluent from the upper rim portion of the outer compartment, the combination which comprises a sludge pocket in the bottom of the outer compartment, means extending along the bottom substantially to the pocket for raking settled solids into the pocket across the bottoms of both compartments, means for aerating the contents of the inner compartment and for causing the aerated contents to circulate up and down in the inner compartment with resultant flocculation of solids, and means for withdrawing the settled solids from the pocket.

ARTHUR M. KIVARI.
EARL M. KELLY.

References Cited in the file of this patent

UNITED STATES PATENTS

| Number | Name | Date |
|---|---|---|
| 2,291,772 | Talbot et al. | Aug. 4, 1942 |
| 2,568,452 | Kelly et al. | Sept. 18, 1951 |

FOREIGN PATENTS

| Number | Country | Date |
|---|---|---|
| 333,974 | Great Britain | Aug. 28, 1930 |